US012731534B2

(12) United States Patent
Park et al.

(10) Patent No.: US 12,731,534 B2
(45) Date of Patent: Sep. 8, 2026

(54) DISPLAY DEVICE AND METHOD OF DRIVING THE SAME

(71) Applicant: Samsung Display Co., Ltd., Yongin-Si (KR)

(72) Inventors: Jung Kook Park, Yongin-si (KR); Dong Hak Pyo, Yongin-si (KR); Seok Hyun Jung, Yongin-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 0 days.

(21) Appl. No.: 19/015,644

(22) Filed: Jan. 10, 2025

(65) Prior Publication Data

US 2025/0232715 A1 Jul. 17, 2025

(30) Foreign Application Priority Data

Jan. 12, 2024 (KR) ........................ 10-2024-0005632

(51) Int. Cl.
*G09G 3/32* (2016.01)
*G09G 3/3233* (2016.01)

(52) U.S. Cl.
CPC ............. *G09G 3/32* (2013.01); *G09G 3/3233* (2013.01); *G09G 2300/0819* (2013.01); *G09G 2310/08* (2013.01)

(58) Field of Classification Search
None
See application file for complete search history.

(56) References Cited

U.S. PATENT DOCUMENTS 8,274,503 B2 9/2012 Kwon
11,514,863 B1 11/2022 Lim
11,682,328 B2 6/2023 Yoo
2006/0227126 A1* 10/2006 Kawagoshi .......... G09G 3/3648 345/211
2015/0213775 A1* 7/2015 Lee ...................... G09G 3/3688 345/212
2019/0304365 A1* 10/2019 Hyun ................... G09G 3/3233
2021/0065628 A1* 3/2021 Kim ..................... G09G 3/3266
2021/0264847 A1* 8/2021 Jeong ................... G09G 3/3233

FOREIGN PATENT DOCUMENTS

KR 10-0873707 B1 12/2008
KR 10-2022-0163555 A 12/2022
KR 10-2023-0016131 A 2/2023

* cited by examiner

*Primary Examiner* — Aneeta Yodichkas
(74) *Attorney, Agent, or Firm* — Innovation Counsel LLP

(57) ABSTRACT

According to the disclosure, a display device includes a pixel including a light emitting element, a pixel circuit for controlling a current flowing from a first power line to a second power line via the light emitting element, and an initialization transistor connected between an anode electrode of the light emitting element and a third power line to which a voltage of initialization power is supplied, and a power supply for supplying the initialization power. The power supply includes an initialization power supply for supplying the initialization power, and a virtual load unit connected to the third power line and for providing an additional load to the third power line.

16 Claims, 10 Drawing Sheets

DISPLAY DEVICE AND METHOD OF DRIVING THE SAME

This application claims priority under 35 U.S.C. § 119 to Korean Patent Application No. 10-2024-0005632 filed on Jan. 12, 2024, in the Korean Intellectual Property Office, the disclosures of which are incorporated by reference herein in their entireties.

BACKGROUND

1. Field

The disclosure relates to a display device and a method of driving the same.

2. Description of the Related Art

As information technology develops, a display device, which is a connection medium between a user and information, plays a more important role in people's lives. In response to this, use of a display device such as a liquid crystal display device and an organic light emitting display device is increasing.

The display device may display an image using pixels. The pixels included in the display device may be set to a non-emission state at least twice during one frame period. For example, the pixels may be connected to an initialization power line, and a light emitting element included in each of the pixels may receive a voltage of initialization power at least twice during one frame period. If a load on the initialization power line is not constant, the voltage of the initialization power supplied to each of the pixels may be set differently.

SUMMARY

The disclosure provides a display device capable of maintaining the load on an initialization power line that supplies initialization power constant.

According to embodiments of the disclosure, a display device includes a pixel including a light emitting element, a pixel circuit for controlling a current flowing from a first power line to a second power line via the light emitting element, and an initialization transistor connected between an anode electrode of the light emitting element and a third power line to which a voltage of initialization power is supplied, and a power supply for supplying the initialization power. The power supply includes an initialization power supply for supplying the initialization power, and a virtual load unit connected to the third power line and providing an additional load to the third power line.

According to an embodiment, the virtual load unit may include a first switch and a first resistor connected in series between the third power line and a ground potential.

According to an embodiment, the display device may further include a timing controller for controlling the virtual load unit.

According to an embodiment, the timing controller may maintain a constant load on the third power line by controlling the first switch.

According to an embodiment, the virtual load unit may include at least one additional switch and an additional resistor connected in parallel with the first switch and the first resistor, and each of the first switch and the additional switch is turned on or turned off under control of the timing controller.

According to an embodiment, the first resistor may be a digital resistor.

According to an embodiment, the timing controller may control the first switch and a resistance value of the first resistor, and maintains a constant voltage on the third power line.

According to an embodiment, the power supply may further include a sensing unit for sensing at least one of a voltage and a current of the third power line and controlling the virtual load unit in response to at least one of the sensed voltage and current.

According to an embodiment, the sensing unit may maintain a constant voltage on the third power line by controlling the first switch.

According to an embodiment, the virtual load unit may include at least one additional switch and an additional resistor connected in parallel with the first switch and the first resistor, and the sensing unit may maintain a constant voltage on the third power line by controlling the first switch and the additional switch.

According to an embodiment, the first resistor may be a digital resistor.

According to an embodiment, the sensing unit may control the first switch and a resistance value of the first resistor and maintains a constant voltage on the third power line.

According to an embodiment, the initialization transistor may be turned on in response to a first scan signal being supplied to a first scan line, and the first scan signal may be supplied at least twice during one frame period.

According to an embodiment, the power supply may further include a first power supply for supplying first driving power to the first power line, and a second power supply for supplying second driving power may have a voltage lower than that of the first driving power to the second power line.

According to an embodiment of the disclosure, a method of driving a display device includes supplying initialization power to a light emitting element in a pixel via an initialization power line, and maintaining a constant load of the initialization power line by controlling a first switch, wherein the first switch and a first resistor are connected in series between the initialization power line and a ground potential.

According to an embodiment, further including turning on and turning off the first switch in response to a switching control signal.

The method may further include sensing a voltage of the initialization power line using a sensing unit, and generating a switching control signal for turning on or turning off the first switch in the sensing unit in response to the sensed voltage of the initialization power line.

According to an embodiment, the sensing unit may generate the switching control signal to maintain a constant voltage on the initialization power line.

According to an embodiment, the first resistor may be a digital resistor, and the sensing unit controls a resistance value of the first resistor to maintain the voltage of the initialization power line at a constant voltage.

According to an embodiment, the pixel is supplied with the voltage of the initialization power at least twice during one frame period.

Features of the disclosure are not limited to what is described above, and other technical features which are not described will be clearly understood by those skilled in the art from the following description.

A display device according to embodiments of the disclosure may include a virtual load unit, and may constantly maintain a load of an initialization power line by selectively connecting a resistor included in the virtual load unit to the initialization power line.

By maintaining a constant load on the initialization power line, initialization power of substantially the same voltage may be supplied to pixels, thereby improving display quality.

Effects of the disclosure are not limited to the above-described effects, and may be variously expanded without departing from the spirit and scope of the disclosure.

BRIEF DESCRIPTION OF THE DRAWINGS

The above and other features of the disclosure will become more apparent by describing in further detail embodiments thereof with reference to the accompanying drawings, in which.

DETAILED DESCRIPTION OF THE EMBODIMENT

Figure 1:
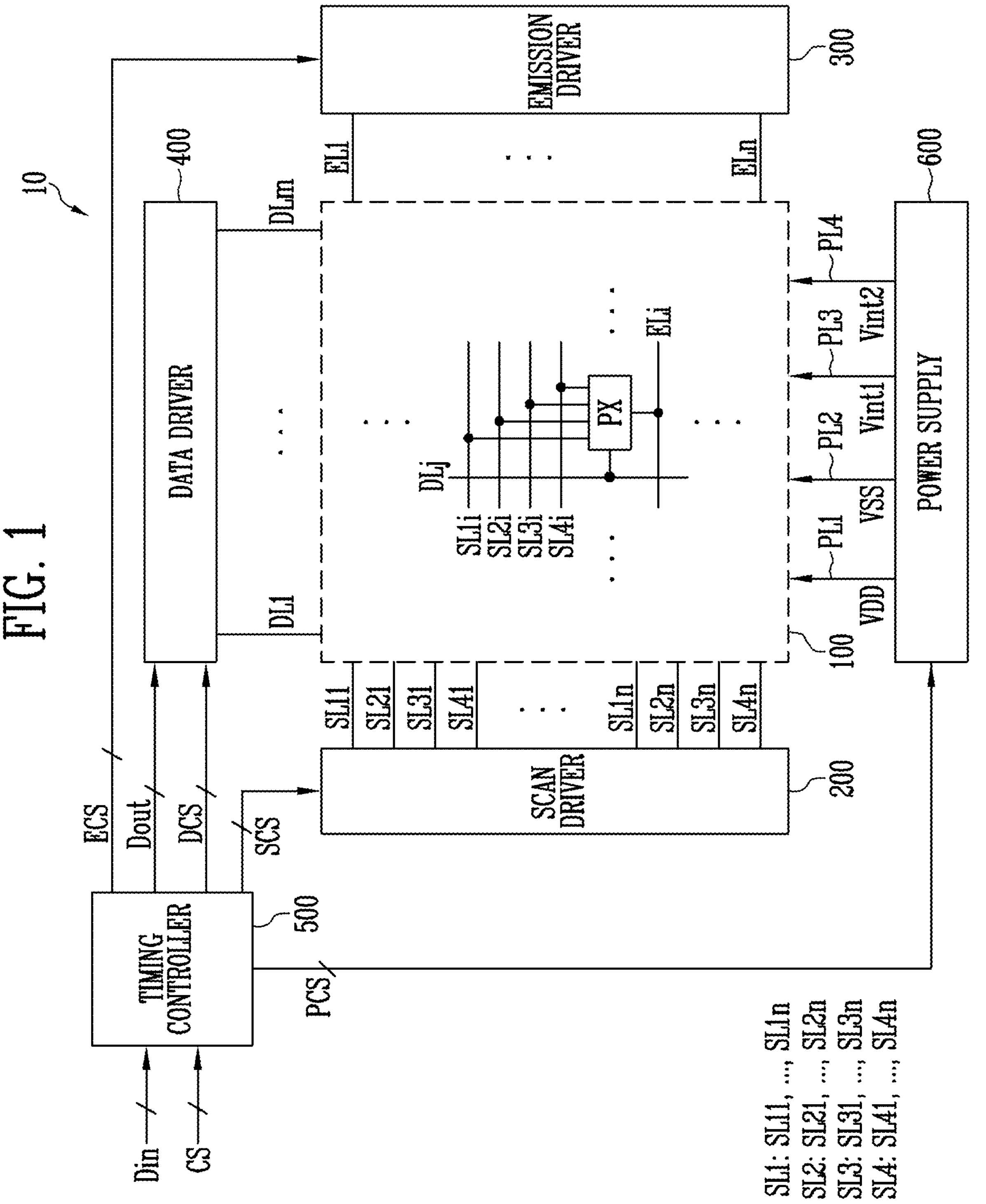
FIG. 1 is a diagram illustrating a display device according to an embodiment of the disclosure.

Hereinafter, various embodiments of the disclosure will be described in detail with reference to the accompanying drawings so that those skilled in the art may easily carry out the disclosure. The disclosure may be implemented in various forms and is not limited to the embodiments described herein.

In order to clearly describe the disclosure, parts that are not related to the description are omitted, and the same or similar elements are denoted by the same reference numerals throughout the specification. Therefore, the above-described reference numerals may be used in other drawings.

In addition, an expression "is the same" in the description may mean "is substantially the same". That is, the expression "is the same" indicates that two things are similar enough for a person of ordinary skill in the art to understand them to be the same. Other expressions may also be expressions in which "substantially" is omitted.

Some embodiments are described in the accompanying drawings in relation to functional block, unit, and/or module. Those skilled in the art will understand that such block, unit, and/or module are/is physically implemented by a logic circuit, an individual component, a microprocessor, a hard wire circuit, a memory element, a line connection, and other electronic circuits. This may be formed using a semiconductor-based manufacturing technique or other manufacturing techniques. The block, unit, and/or module implemented by a microprocessor or other similar hardware may be programmed and controlled using software to perform various functions discussed herein, optionally may be driven by firmware and/or software. In addition, each block, unit, and/or module may be implemented by dedicated hardware, or a combination of dedicated hardware that performs some functions and a processor (for example, one or more programmed microprocessors and related circuits) that performs a function different from those of the dedicated hardware. In addition, in some embodiments, the block, unit, and/or module may be physically separated into two or more individual blocks, units, and/or modules without departing from the scope of the inventive concept. In addition, in some embodiments, the block, unit and/or module may be physically combined into more complex blocks, units, and/or modules without departing from the scope of the inventive concept.

A term "connection" between two configurations may mean that an electrical connection and a physical connection are used inclusively, but is not limited thereto. For example, "connection" used based on a circuit diagram may mean an electrical connection, and "connection" used based on a cross-sectional view and a plan view may mean a physical connection.

Although a first, a second, and the like are used to describe various components, these components are not limited by these terms. These terms are used only to distinguish one component from another component. Therefore, a first component described below may be a second component within the technical spirit of the disclosure. The singular expression includes the plural expression unless the context clearly dictates otherwise.

Meanwhile, the disclosure is not limited to the embodiments disclosed below, and may be modified in various forms and may be implemented. In addition, each of the embodiments disclosed below may be implemented alone or in combination with at least one of the other embodiments.

FIG. 1 is a diagram illustrating a display device according to an embodiment of the disclosure.

Referring to FIG. 1, the display device according to an embodiment of the disclosure may include a pixel unit 100, a scan driver 200, an emission driver 300, a data driver 400, a timing controller 500, and a power supply 600.

The display device 10 may display an image at various frame frequencies (driving frequency, refresh rate, or screen reproduction rate) according to a driving condition. The frame frequency is a frequency at which a data voltage is substantially written to a driving transistor of a pixel PX for one second. For example, the frame frequency is also referred to as a screen scan rate or a screen reproduction frequency, and indicates a frequency at which a display screen is reproduced for one second.

In an embodiment, a frequency of a second scan signal supplied to a second scan line SL2 for data signal supply may be changed in response to the frame frequency. For example, a frame frequency for moving image driving may be a frequency of about 60 Hz or higher (for example, 60 Hz, 120 Hz, or 240 Hz). If the frame frequency is 60 Hz, the second scan signal may be supplied 60 times per second to each horizontal line i (or pixel row).

In an embodiment, the display device 10 may adjust an output frequency of the scan driver 200 and the emission driver 300, and an output frequency of the data driver 400 corresponding to the output frequency of the scan driver 200 and the emission driver 300 according to the driving condition. For example, the display device 10 may display an image in response to various frame frequencies of 1 Hz to 120 Hz. However, this is an example, and the display device 10 may display an image at a frame frequency of 120 Hz or higher (for example, 240 Hz or 480 Hz).

The pixel unit 100 may include scan lines SL11 to SL1*n*, SL21 to SL2*n*, SL31 to SL3*n*, and SL41 to SL4*n*, emission control lines EL1 to ELn, and data lines DL1 to DLm, and may include pixels PX connected to the scan lines SL11 to SL1*n*, SL21 to SL2*n*, SL31 to SL3*n*, and SL41 to SL4*n*, the emission control lines EL1 to ELn, and the data lines DL1 to DLm (here, n and m are natural numbers greater than or equal to 2). Each of the pixels PX may include a light emitting element and a driving transistor.

The timing controller 500 may receive input data Din and a control signal CS from a host system such as an application processor (AP) through a predetermined interface. The timing controller 500 may control the timing for driving the scan driver 200, the emission driver 300, and the data driver 400. In addition, the timing controller 500 may control the power supply 600.

The timing controller 500 may generate a scan driving signal SCS, an emission driving signal ECS, a data driving signal DCS, and a power driving signal PCS. The respective scan driving signal SCS, emission driving signal ECS, data driving signal DCS, and power driving signal PCS may be supplied to the scan driver 200, the emission driver 300, the data driver 400, and the power supply 600. In addition, the timing controller 500 may correct (or rearrange) the input data Din to generate output data Dout and supply the output data Dout to the data driver 400. A person skilled in the art will understand how to provide a suitable timing controller.

The scan driver 200 may respectively supply a first scan signal, a second scan signal, a third scan signal, and a fourth scan signal to the first scan lines SL1, the second scan lines SL2, the third scan lines SL3, and the fourth scan lines SL4 based on the scan driving signal SCS. For example, the scan driver 200 may sequentially supply the first scan signal to the first scan lines SL1. For example, the scan driver 200 may sequentially supply the second scan signal to the second scan lines SL2. For example, the scan driver 200 may sequentially supply the third scan signal to the third scan lines SL3. For example, the scan driver 200 may sequentially supply the fourth scan signal to the fourth scan lines SL4.

Each of the first to fourth scan signals may be set to a gate-on voltage corresponding to a type of a transistor receiving a corresponding scan signal. The transistor receiving the scan signal may be set to a turn-on state while receiving the scan signal. For example, a gate-on voltage of a scan signal supplied to a P-channel metal oxide semiconductor (PMOS) transistor may be a logic low level, and a gate-on voltage of a scan signal supplied to an N-channel metal oxide semiconductor (NMOS) transistor may be a logic high level. Hereinafter, a meaning of "the scan signal is supplied" may be understood as that the scan signal is supplied at a logic level that turns on a transistor controlled thereby. In addition, a meaning of "supply of the scan signal is stopped" may be understood as that the scan signal is supplied at a logic level that turns off the transistor controlled thereby.

The emission driver 300 may supply an emission control signal to the emission control lines EL1 to ELn based on the emission driving signal ECS. The emission driver 300 may sequentially supply the emission control signal to the emission control lines EL1 to ELn.

The emission control signal may be set to a gate-off voltage. A transistor receiving the emission control signal may be turned off while receiving the emission control signal, and may be turned on otherwise. Hereinafter, a meaning of "the emission control signal is supplied/received" may be understood as that the emission control signal is supplied or received at a logic level that turns off a transistor controlled thereby. In addition, a meaning of "supply of the emission control signal is stopped" may be understood as that the emission control signal is supplied at a logic level that turns on the transistor controlled thereby.

In FIG. 1, for convenience of description, each of the scan driver 200 and the emission driver 300 is shown as a separate element, but the disclosure is not limited thereto. According to a design, the scan driver 200 may include a plurality of scan drivers each supplying at least one of the first to fourth scan signals. In addition, at least a portion of the scan driver 200 and the emission driver 300 may be integrated into one driving circuit, module, or the like.

In addition, the number of scan lines SL1, SL2, SL3, and SL4 may be set differently according to the structure of the pixels PX. For example, the third scan line SL3 and/or the fourth scan line SL4 may be omitted according to the structure of the pixels PX. In addition, the emission control lines EL1 to ELn may be omitted according to the structure of the pixels PX.

The data driver 400 may receive the data driving signal DCS and the output data Dout from the timing controller 500. The data driver 400 may convert the digital output data Dout into an analog data signal (or data voltage) in response to the data driving signal DCS. The data driver 400 may supply a data signal to the data lines DL1 to DLm. For example, the data driver 400 may supply the data signal to the data lines DL1 to DLm in synchronization with the second scan signal sequentially supplied to the second scan lines SL21 to SL2*n*.

The power supply 600 may generate voltages of first driving power VDD, second driving power VSS, first initialization power Vint1, and second initialization power Vint2 based on the power driving signal PCS, and supply the voltages to the pixels PX. The first driving power VDD may be supplied to the pixels PX via a first power line PL1. The second driving power VSS may be supplied to the pixels PX via a second power line PL2. The first initialization power Vint1 may be supplied to the pixels PX via a third power line PL3. The second initialization power Vint2 may be supplied to the pixels PX via a fourth power line PL4.

In an embodiment, the power supply 600 may include a virtual load unit which is not shown, and may control a load of the third power line PL3 to be constant using the virtual load unit. "Maintaining a constant voltage" or "maintaining a constant load," as used herein, refers to maintaining the voltage or load variation to a low level to avoid having to use different initialization power levels. A detailed description related to this is provided later with reference to FIGS. 7 to 12.

Figure 2:
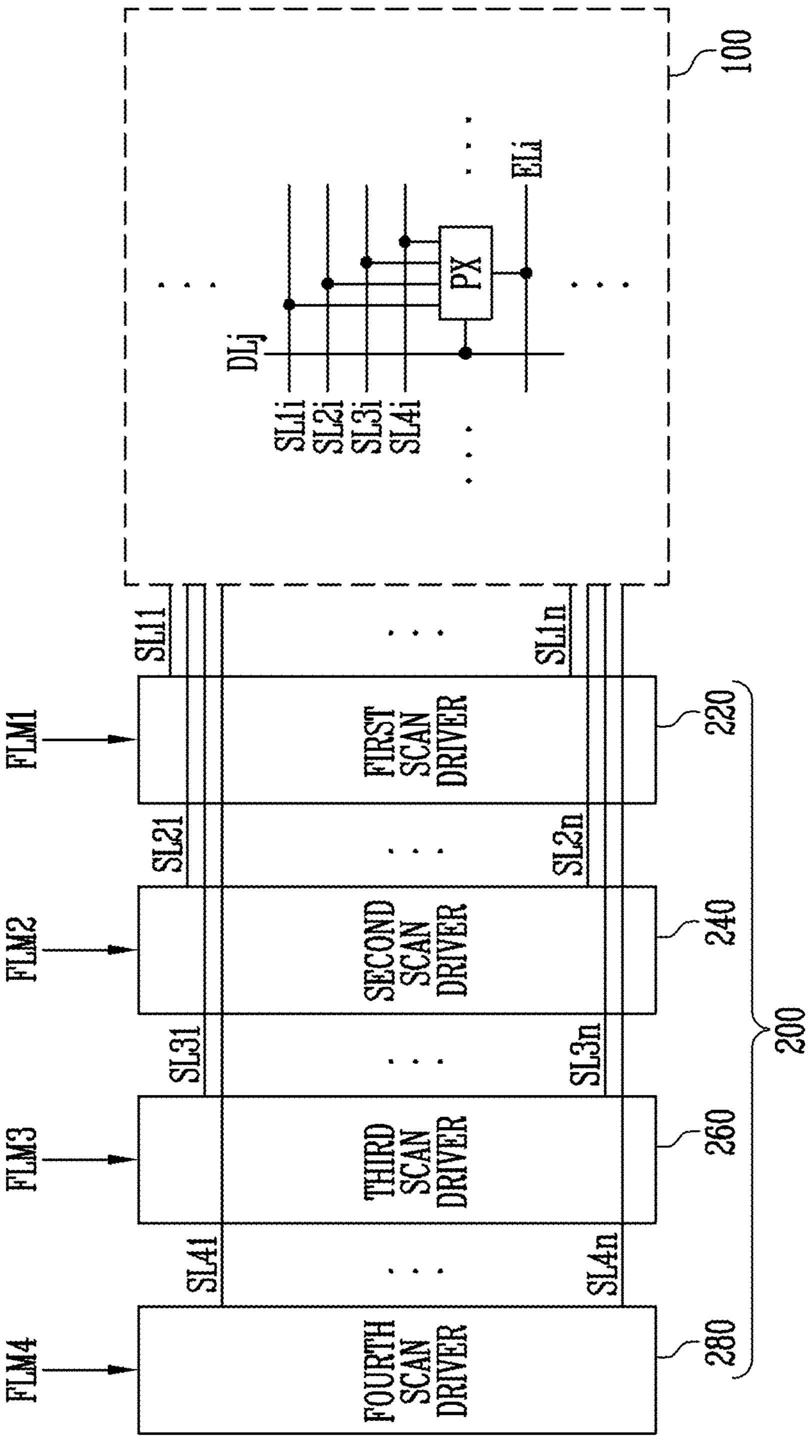
FIG. 2 is a diagram illustrating an embodiment of a scan driver included in the display device of FIG. 1.

FIG. 2 is a diagram illustrating an embodiment of the scan driver included in the display device of FIG. 1.

Referring to FIG. 2, the scan driver 200 may include a first scan driver 220, a second scan driver 240, a third scan driver 260, and a fourth scan driver 280.

The scan driving signal SCS may include a first start signal FLM1, a second start signal FLM2, a third start signal FLM3, and a fourth start signal FLM4. The first start signal FLM1, the second start signal FLM2, the third start signal FLM3, and the fourth start signal FLM4 may be supplied to the first scan driver 220, the second scan driver 240, the third scan driver 260, and the fourth scan driver 280, respectively. A width, a supply timing, and the like of the first to fourth start signals FLM1 to FLM4 may be determined according to a driving condition and a frame frequency of the pixel PX.

The first scan driver 220 may sequentially supply the first scan signal to the first scan lines SL11 to SL1*n* in response to the first start signal FLM1. The second scan driver 240 may sequentially supply the second scan signal to the second scan lines SL21 to SL2*n* in response to the second start signal FLM2. The third scan driver 260 may sequentially supply the third scan signal to the third scan lines SL31 to SL3*n* in response to the third start signal FLM3. The fourth scan driver 280 may sequentially supply the fourth scan signal to the fourth scan lines SL41 to SL4*n* in response to the fourth start signal FLM4.

Figure 3:
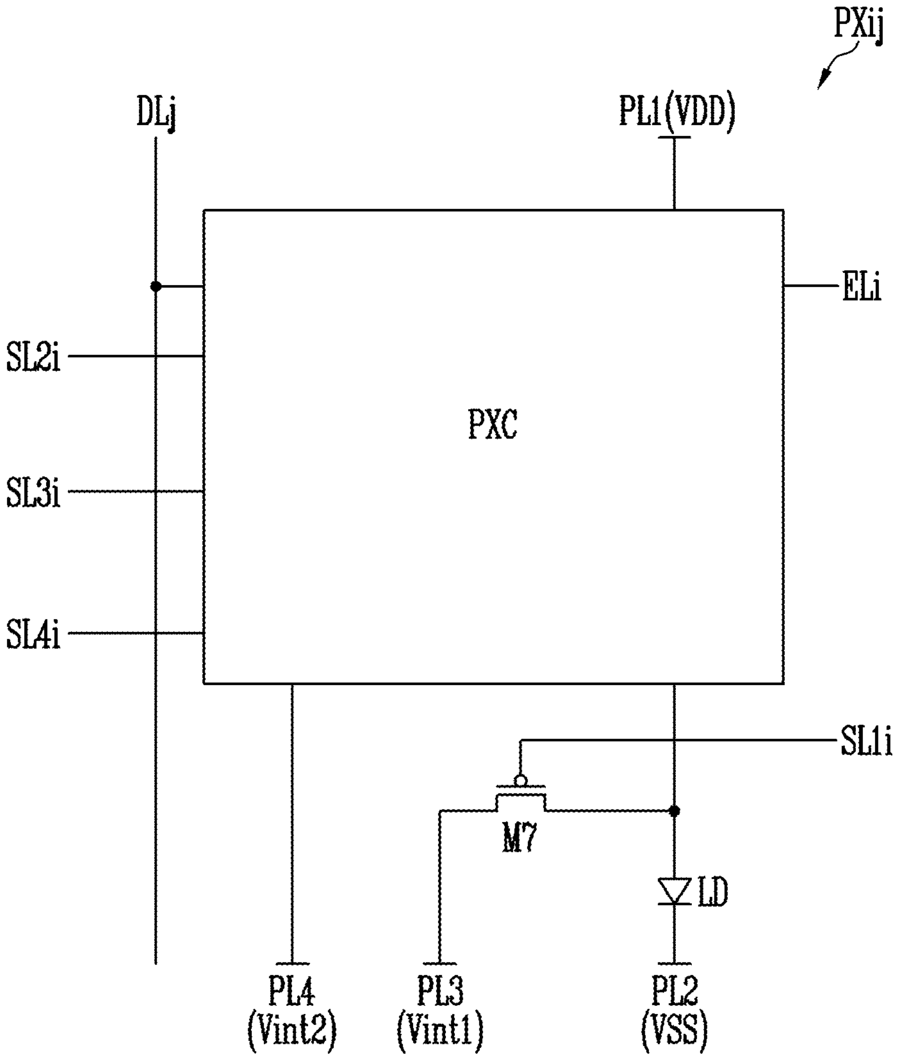
FIG. 3 is a diagram illustrating an embodiment of a pixel included in the display device of FIG. 1.

FIG. 3 is a diagram illustrating an embodiment of the pixel included in the display device of FIG. 1. In FIG. 3, for convenience of description, a pixel positioned on an i-th horizontal line (or an i-th pixel row) and connected to a j-th data line DLj is shown (here, i and j are natural numbers less than n).

Referring to FIG. 3, the pixel PXij according to an embodiment of the disclosure may include a light emitting element LD, a pixel circuit PXC, and a seventh transistor M7 (or an initialization transistor).

A first electrode (or an anode electrode) of the light emitting element LD may be connected to the pixel circuit PXC, and a second electrode (or a cathode electrode) may be connected to the second power line PL2 supplied with the second driving power VSS. The light emitting element LD may generate light of a predetermined luminance in response to a current amount supplied from the pixel circuit PXC.

The light emitting element LD may be selected as an organic light emitting diode. In addition, the light emitting element LD may be selected as an inorganic light emitting diode such as a micro light emitting diode (LED) or a quantum dot light emitting diode. In addition, the light emitting element LD may be an element in which an organic material and an inorganic material are combined. In FIG. 3, the pixel PXij includes a single light emitting element LD, but in another embodiment, the pixel PX may include a plurality of light emitting elements, and the plurality of light emitting elements may be connected in series, in parallel, or in series-parallel with each other.

The pixel circuit PXC may control the current amount supplied to the light emitting element LD in response to the data signal supplied from the data line DLj. For example, the pixel circuit PXC may control the current amount supplied from the first power line PL1 (or the first driving power VDD) to the second power line PL2 (or the second driving power VSS) via the light emitting element LD in response to the data signal. To this end, the pixel circuit PXC may include at least one transistor and a capacitor. The pixel circuit PXC may be implemented with various types of circuits currently known.

For example, the pixel circuit PXC may be connected to a second scan line SL2*i*, a third scan line SL3*i*, a fourth scan line SL4*i*, and an emission control line ELi. In addition, the pixel circuit PXC may be connected to the first power line PL1 supplied with the first driving power VDD and the fourth power line PL4 supplied with the second initialization power Vint2.

The seventh transistor M7 may be connected between the first electrode of the light emitting element LD and the third power line PL3 to which the first initialization power Vint1 is supplied. In addition, a gate electrode of the seventh transistor M7 may be connected to the first scan line SL1*i*. The seventh transistor M7 may be turned on while the first scan signal is supplied to the first scan line SL1*i* and may supply a voltage of the first initialization power Vint1 to the first electrode of the light emitting element LD. The scan driver 200 may supply the first scan signal to the first scan line SL1*i* at least twice during one frame period.

In response to the voltage of the first initialization power Vint1 being supplied to the first electrode of the light emitting element LD, a parasitic capacitor of the light emitting element LD may be discharged. As a residual voltage charged in the parasitic capacitor of the light emitting element LD is discharged (or removed), unintended fine-emission may be prevented. Accordingly, black expression of the pixel PXij may be improved.

Figure 4:
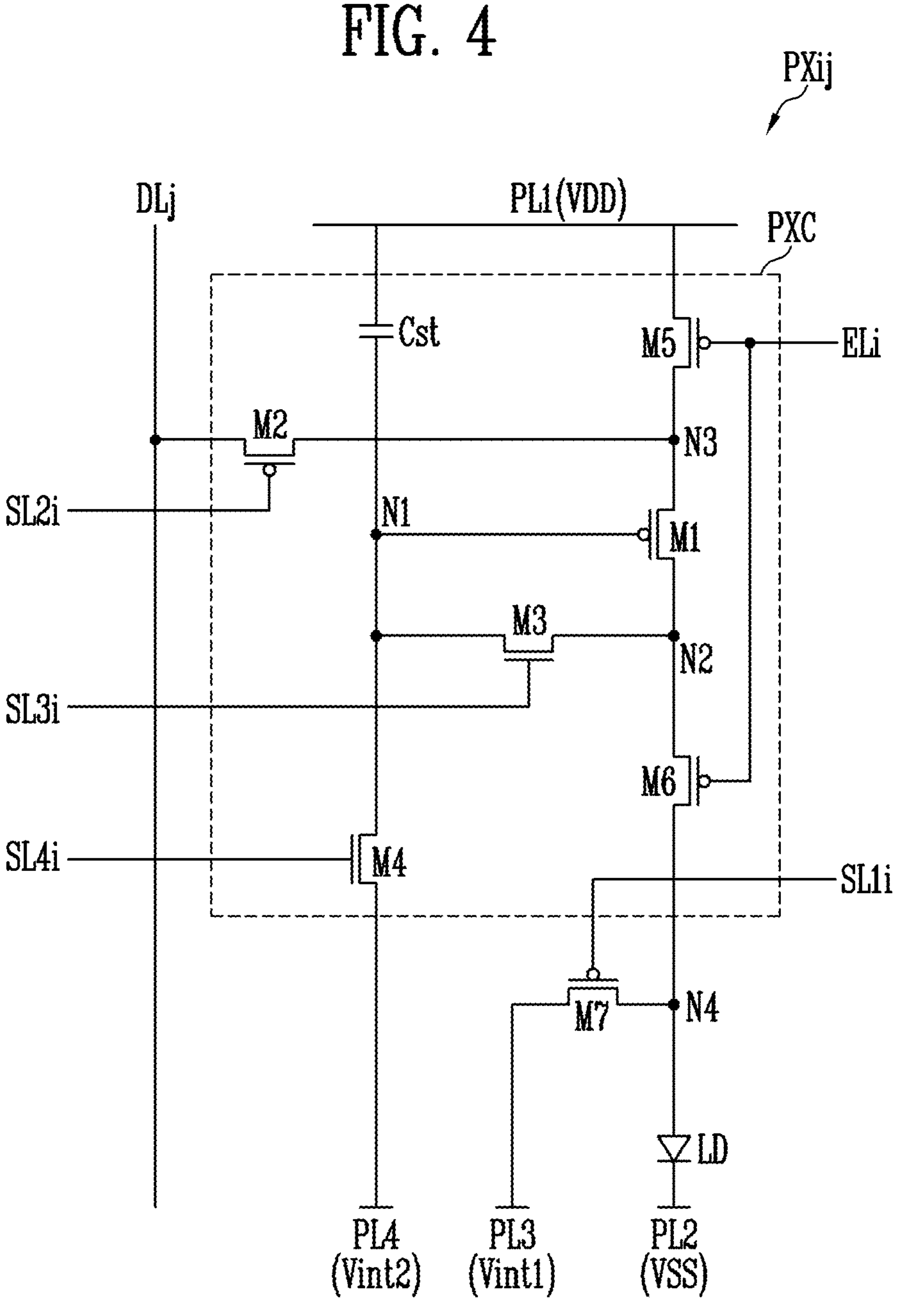
FIG. 4 is a diagram illustrating an embodiment of a pixel circuit shown in FIG. 3.

FIG. 4 is a diagram illustrating an embodiment of the pixel circuit shown in FIG. 3.

Referring to FIG. 4, the pixel circuit PXC according to an embodiment of the disclosure may include first to seventh transistors M1 to M7 and a storage capacitor Cst.

A first electrode of the first transistor M1 (or a driving transistor) may be connected to a third node N3, and a second electrode may be connected to a second node N2. In addition, a gate electrode of the first transistor M1 may be connected to a first node N1. The first transistor M1 may control a current amount supplied from the first driving power VDD to the second driving power VSS via the light emitting element LD in response to a voltage of the first node N1. To this end, the first driving power VDD may be set to a voltage higher than that of the second driving power VSS.

The second transistor M2 may be connected between the data line DLj and the third node N3. In addition, a gate electrode of the second transistor M2 may be connected to the second scan line SL2*i*. The second transistor M2 may be turned on in response to the second scan signal being supplied to the second scan line SL2*i* to electrically connect the data line DLj and the third node N3.

The third transistor M3 may be connected between the first node N1 and the second node N2. In addition, a gate electrode of the third transistor M3 may be connected to the third scan line SL3*i*. The third transistor M3 may be turned on in response to the third scan signal being supplied to the third scan line SL3*i* to electrically connect the first node N1 and the second node N2. With the third transistor M3 turned on, the first transistor M1 is connected in a diode form.

The fourth transistor M4 is connected between the first node N1 and the fourth power line PL4 to which the second initialization power Vint2 is supplied. In addition, a gate electrode of the fourth transistor M4 is connected to the fourth scan line SL4*i*. The fourth transistor M4 may be turned on in response to the fourth scan signal being supplied to the fourth scan line SL4*i* to supply the voltage of the second initialization power Vint2 to the first node N1. Here, the voltage of the second initialization power Vint2 may be set to a voltage lower than the data signal supplied to the data line DLj.

The fifth transistor M5 is connected between a first power line PL1 receiving the first driving power VDD and the third node N3. In addition, a gate electrode of the fifth transistor M5 may be connected to the emission control line ELi. The fifth transistor M5 may be turned off while the emission control signal is supplied to the emission control line ELi, and may be turned on otherwise.

The sixth transistor M6 is connected between the second node N2 and the fourth node N4. In addition, a gate electrode of the sixth transistor M6 may be connected to the emission control line ELi. The sixth transistor M6 may be turned off while the emission control signal is supplied to the emission control line ELi, and may be turned on otherwise. Meanwhile, in FIG. 4, the fifth transistor M5 and the sixth transistor M6 are connected to the same emission control line ELi, but the disclosure is not limited thereto. In an embodiment, the fifth transistor M5 and the sixth transistor M6 may be connected to different emission control lines.

Meanwhile, the first initialization power Vint1 and the second initialization power Vint2 may be set to voltages different from each other. That is, a voltage supplied to the first electrode of the light emitting element LD and a voltage supplied to the gate electrode of the first transistor M1 may be set differently. However, this is an example, and the voltage of the first initialization power Vint1 and the voltage of the second initialization power Vint2 may be substantially the same.

The storage capacitor Cst is connected between the first power line PL1 and the first node N1. The storage capacitor Cst may store a voltage applied to the first node N1.

In an embodiment, the first transistor M1, the second transistor M2, the fifth transistor M5, the sixth transistor M6, and the seventh transistor M7 may be formed of a polysilicon semiconductor transistor. For example, the first transistor M1, the second transistor M2, the fifth transistor M5, the sixth transistor M6, and the seventh transistor M7 may include a polysilicon semiconductor layer formed through a low temperature poly-silicon (LTPS) process as an active layer (channel). In addition, the first transistor M1, the second transistor M2, the fifth transistor M5, the sixth transistor M6, and the seventh transistor M7 may be a P-type transistor (for example, a PMOS transistor). Accordingly, a gate-on voltage that turns on the first transistor M1, the second transistor M2, the fifth transistor M5, the sixth transistor M6, and the seventh transistor M7 may be a logic low level.

Since the polysilicon semiconductor transistor has a fast response speed, the polysilicon semiconductor transistor may be applied to a switching element requiring fast switching.

In an embodiment, the third transistor M3 and the fourth transistor M4 may be formed of an oxide semiconductor transistor. For example, the third transistor M3 and the fourth transistor M4 may be an N-type oxide semiconductor transistor (for example, an NMOS transistor), and may include an oxide semiconductor layer as an active layer. Accordingly, a gate-on voltage that turns on the third transistor M3 and the fourth transistor M4 may be a logic high level.

The oxide semiconductor transistor may be processed at a low temperature and has a charge mobility lower than that of a polysilicon semiconductor transistor. That is, the oxide semiconductor transistor has an excellent off current characteristic. Therefore, if the third transistor M3 and the fourth transistor M4 are formed of an oxide semiconductor transistor, a leakage current from the first node N1 according to low-frequency driving may be minimized, and display quality may be improved.

Figure 5:
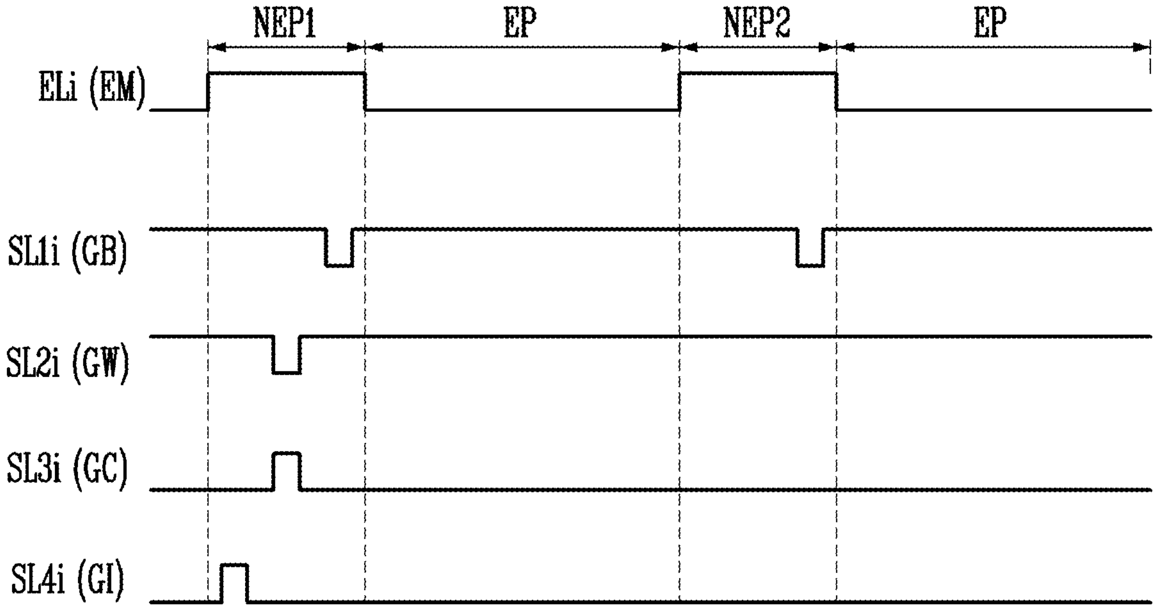
FIG. 5 is a waveform diagram illustrating a method of driving a pixel shown in FIG. 4.

FIG. 5 is a waveform diagram illustrating a method of driving the pixel shown in FIG. 4. FIG. 5 may illustrate a driving waveform supplied during one frame period.

Referring to FIG. 5, one frame period may include an emission period EP, a first non-emission period NEP1, and a second non-emission period NEP2. The emission period EP may be adjacent to each of the first non-emission period NEP1 and the second non-emission period NEP2.

In FIG. 5, the two non-emission periods NEP1 and NEP2 are included in one frame period, but the disclosure is not limited thereto. For example, the number of non-emission periods NEP1 and NEP2 included in one frame period may be set variously according to the frame frequency and/or setting of the display device 10.

The first non-emission period NEP1 may refer to a period in which the data signal is written. The second non-emission period NEP2 may refer to a period in which a previous data signal is maintained and the pixel PXij does not emit light. By including a plurality of non-emission periods in one frame period, motion blur and the like may be reduced, and moving image quality may be improved. In addition, if one frame period includes a plurality of non-emission periods, an image of a uniform luminance may be displayed even though the frame frequency changes.

An emission control signal EM may be supplied a plurality of times during one frame period. That is, the emission control signal EM may have an off period corresponding to the first non-emission period NEP1 and the second non-emission period NEP2. Here, the off period of the emission control signal EM may refer to a period in which the emission control signal is supplied and thus the fifth transistor M5 and the sixth transistor M6 are turned off. The off period may be divided into a first off period corresponding to the first non-emission period NEP1 and a second off period corresponding to the second non-emission period NEP2.

Describing an operation process, first, the fifth transistor M5 and the sixth transistor M6 are turned off by the emission control signal EM supplied to the emission control line ELi during the first non-emission period NEP1. If the fifth transistor M5 and the sixth transistor M6 are turned off, electrical connection between the first power line PL1 and the light emitting element LD is blocked, and the light emitting element LD is set to a non-emission state.

Thereafter, a fourth scan signal GI is supplied to the fourth scan line SL4*i*, and thus the fourth transistor M4 is turned on. If the fourth transistor M4 is turned on, the voltage of the second initialization power Vint2 is supplied to the first node N1, and the first node N1 is initialized to the voltage of the second initialization power Vint2.

Thereafter, a second scan signal GW is supplied to the second scan line SL2*i*, and a third scan signal GC is supplied to the third scan line SL3*i*. If the second scan signal GW is supplied to the second scan line SL2*i*, the second transistor M2 is turned on. If the third scan signal GC is supplied to the third scan line SL3*i*, the third transistor M3 is turned on.

With the second transistor M2 turned on, the data line DLj and the third node N3 are electrically connected, and thus the data signal is supplied from the data line DLj to the third node N3. If the third transistor M3 is turned on, the first transistor M1 is connected in a diode form. In this case, the data signal supplied to the third node N3 is supplied to the first node N1 via the first transistor M1 connected in the diode form. Therefore, a voltage corresponding to the data signal and a threshold voltage of the first transistor M1 may be applied to the first node N1. The storage capacitor Cst stores the voltage applied to the first node N1.

After the data signal and the voltage corresponding to the threshold voltage of the first transistor M1 are stored in the storage capacitor Cst, a first scan signal GB is supplied to the first scan line SL1*i*. If the first scan signal GB is supplied to the first scan line SL1*i*, the seventh transistor M7 is turned on. If the seventh transistor M7 is turned on, the voltage of the first initialization power Vint1 may be supplied to the fourth node N4, and thus the first electrode of the light emitting element LD may be initialized to the voltage of the first initialization power Vint1.

Thereafter, supply of the emission control signal EM to the emission control line ELi is stopped. If supply of the emission control signal EM is stopped, the fifth transistor M5 and the sixth transistor M6 are turned on. With the fifth transistor M5 and the sixth transistor M6 turned on, the first power line PL1 may be electrically connected to the first electrode of the light emitting element LD via the fifth transistor M5, the first transistor M1, and the sixth transistor M6. At this time, the first transistor M1 supplies a driving current corresponding to the voltage applied to the first node N1 to the light emitting element LD, and the light emitting element LD emits light with a luminance corresponding to the driving current. That is, the light emitting element LD may emit light with the luminance corresponding to the driving current during the emission period EP after the first non-emission period NEP1.

In the second non-emission period NEP2, the emission control signal EM is supplied to the emission control line ELi, and thus the fifth transistor M5 and the sixth transistor M6 are turned off. With the fifth transistor M5 and the sixth transistor M6 turned off, electrical connection between the first power line PL1 and the light emitting element LD is blocked, and the light emitting element LD is set to the non-emission state.

In addition, in the second non-emission period NEP2, the first scan signal GB may be supplied to the first scan line SL1*i*. If the first scan signal GB is supplied to the first scan line SL1*i*, the seventh transistor M7 may be turned on, and thus the first electrode of the light emitting element LD may be initialized to the voltage of the first initialization power Vint1. With the voltage of the first initialization power Vint1 supplied to the first electrode of the light emitting element LD during the second non-emission period NEP2, a luminance increase of the light emitting element LD may be prevented.

In the second non-emission period NEP2, the second scan signal GW, the third scan signal GC, and the fourth scan signal GI are not supplied. Therefore, the storage capacitor Cst may maintain the voltage stored in the first non-emission period NEP1. During the emission period EP following the second non-emission period NEP2, supply of the emission control signal EM is stopped, and thus the fifth transistor M5 and the sixth transistor M6 are turned on. Then, during the emission period EP following the second non-emission period NEP2, the light emitting element LD may emit light with a luminance corresponding to the driving current.

Figure 6:
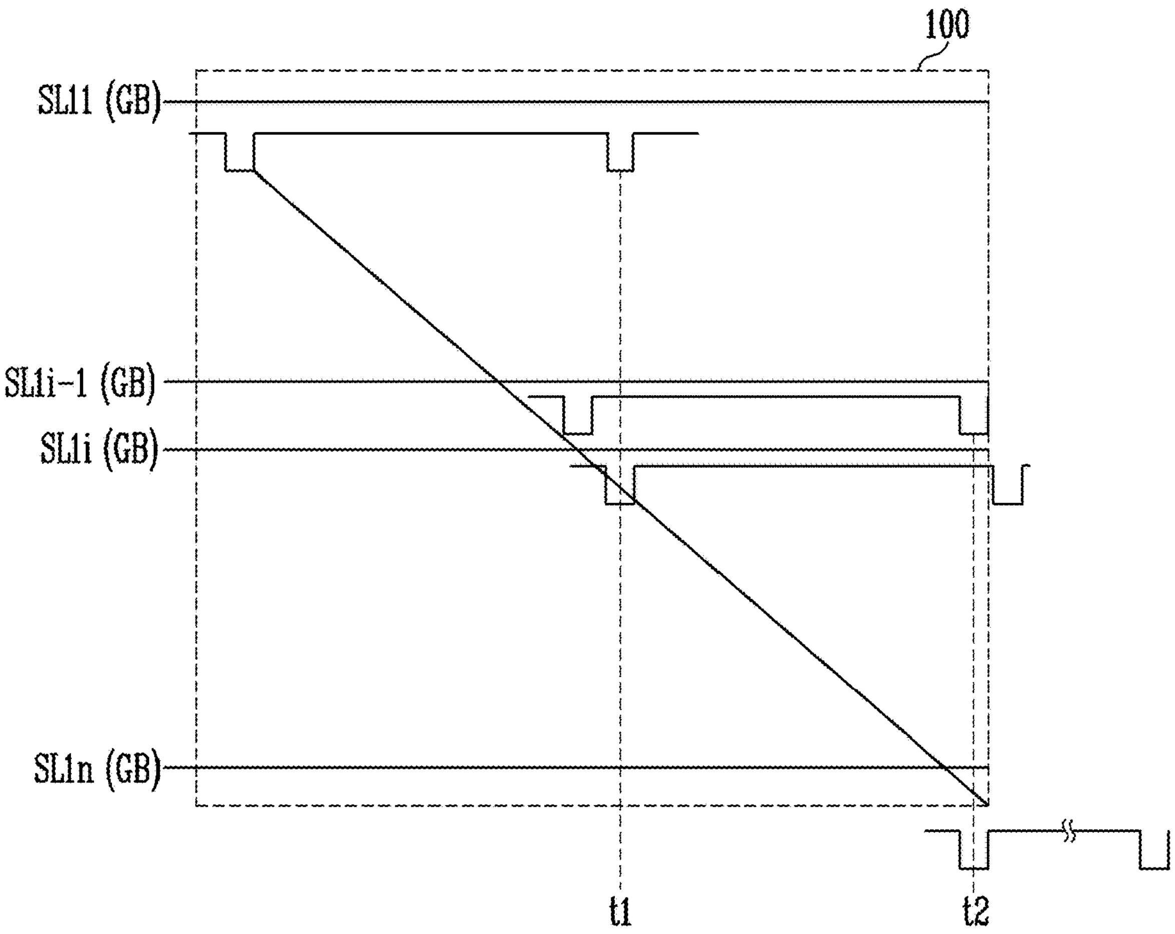
FIG. 6 is a diagram illustrating a first scan signal supplied to a first scan line during one frame period.

FIG. 6 is a diagram illustrating the first scan signal supplied to the first scan line during one frame period.

Referring to FIGS. 5 and 6, one frame period includes the first non-emission period NEP1 and the second non-emission period NEP2. In addition, the scan driver 200 may sequentially supply the first scan signal GB to the first scan lines SL11 to SL1*n* during the first non-emission period NEP1 and the second non-emission period NEP2.

In this case, the first scan signal GB may be supplied to two of the first scan lines SL11 to SL1*n* in a first period of one frame period, and first scan signal GB may be supplied to one scan line in a second period different from the first period.

For example, as illustrated in FIG. 6, at a first time point t1, the first scan signal GB supplied to the first scan line SL11 during the second non-emission period NEP2 and the first scan signal GB supplied to the first scan line SL1*i* during the first non-emission period NEP1 may overlap in time. Similarly, at a second time point t2, the first scan signal GB supplied to a first scan line SL1*i*-1 during the second non-emission period NEP2 and the first scan signal GB supplied to an n-th scan line SL1*n* during the first non-emission period NEP1 may overlap in time.

For example, the first period in which the first scan signal GB is supplied to two first scan lines may include a period between the first time point t1 and the second time point t2. The second period in which the first scan signal GB is supplied to one first scan line may include a period less than the first time point t1 and a period exceeding the second time point t2.

When the number of first scan lines to which the first scan signal GB is supplied is set differently, a load on the third power line PL3 may be set differently. For example, the load on the third power line PL3 during the first period and the load on the third power line PL3 during the second period may be set differently.

If the load on the third power line PL3 is set differently during the first period and the second period, the voltage of the first initialization power Vint1 supplied in the first period and the second period may be set differently. If the first initialization power Vint1 of different voltages is supplied to the pixels PX in the first period and the second period, a non-uniform luminance may be displayed in the pixels PX in response to the same data signal.

In order to prevent this, an embodiment of the disclosure proposes a method of maintaining the load on the third power line PL3 constant during the first period and the second period.

Figure 7:
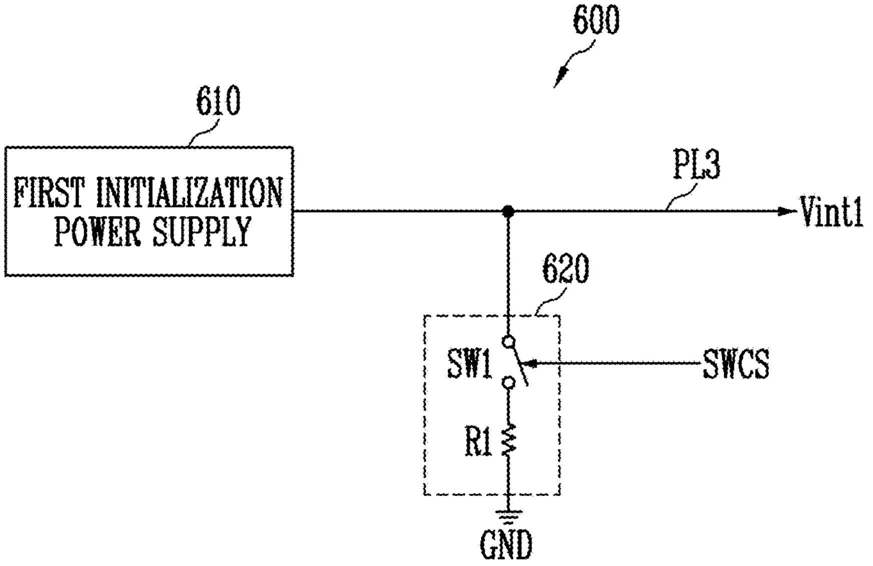
FIG. 7 is a diagram illustrating a power supply according to an embodiment of the disclosure.

FIG. 7 is a diagram illustrating a power supply according to an embodiment of the disclosure. In FIG. 7, only configuration that is helpful for description of the disclosure is shown.

Referring to FIG. 7, the power supply 600 according to an embodiment of the disclosure may include a first initialization power supply 610 (or an initialization power supply) and a virtual load unit 620. The first initialization power supply 610 may supply the voltage of the first initialization power Vint1 (or initialization power) to the third power line PL3 (or an initialization power line). For example, the first initialization power supply 610 may be configured of a DC-DC converter, a low dropout regulator (LDO), another type of regulator, or the like.

The virtual load unit 620 may be connected to the third power line PL3. The virtual load unit 620 may provide a virtual load to the third power line PL3 in response to a switching control signal SWCS supplied from the timing controller 500. The switching control signal SWCS may be included in the power driving signal PCS. The virtual load unit 620 may include a first switch SW1 and a first resistor R1 connected in series between the third power line PL3 and a ground potential GND.

The first switch SW1 may be turned on or turned off in response to the switching control signal SWCS. For example, the first switch SW1 may be turned off in the first period and turned on in the second period of one frame period in response to the switching control signal SWCS.

The first resistor R1 may have a predetermined resistance value. For example, the first resistor R1 may have a resistance value corresponding to the load applied to the third power line PL3 of one horizontal line i (see FIG. 3) when the first scan signal GB is supplied.

Describing an operation process, the first switch SW1 is turned off in response to the switching control signal SWCS in the first period of one frame period. With the first switch SW1 is turned off, the first resistor R1 is not connected to the third power line PL3. In this case, a load corresponding to two horizontal lines (e.g., i and i+1) may be applied to the third power line PL3.

The first switch SW1 is turned on in response to the switching control signal SWCS in the second period of one frame period. With the first switch SW1 turned on, the first resistor R1 is connected to the third power line PL3. Then, a load corresponding to one horizontal line may be additionally applied to the third power line PL3. That is, during the second period, the load corresponding to two horizontal lines may be applied to the third power line PL3. Therefore, the load of the third power line PL3 may be maintained constant during the first period and the second period, and thus display quality may be improved.

Meanwhile, the switching control signal SWCS may be generated by identifying the first period and the second period of one frame period and storing turn-on and turn-off times of the first switch SW1 in relation to the first period and the second period to the timing controller 500 in advance.

Figure 8:
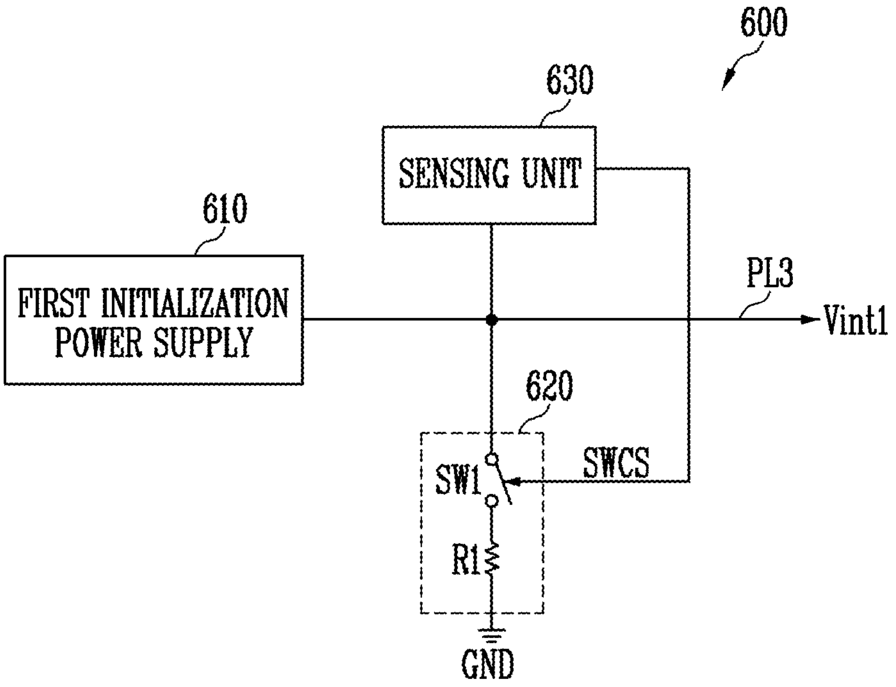
FIG. 8 is a diagram illustrating a power supply according to an embodiment of the disclosure.

FIG. 8 is a diagram illustrating a power supply according to an embodiment of the disclosure. In describing FIG. 8, the same reference numerals are assigned to the same configurations as those of FIG. 7, and any redundant description is omitted.

Referring to FIG. 8, the power supply 600 according to an embodiment of the disclosure may include the first initialization power supply 610, the virtual load unit 620, and a sensing unit 630.

The sensing unit 630 may be connected to the third power line PL3 and may sense a voltage and/or a current of the third power line PL3. Thereafter, for convenience of description, the disclosure is focused on a case where the voltage of the third power line PL3 is sensed by the sensing unit 630. The sensing unit 630 may generate the switching control signal SWCS so that the first switch SW1 is turned on or turned off in response to the voltage of the third power line PL3. The sensing unit 630 may control turn-on and turn-off of the first switch SW1 so that the voltage (or the load) of the third power line PL3 becomes constant.

The voltage sensed by the sensing unit 630 may be different in the first period and the second period. For example, the first period has a load higher than that of the second period, and thus the voltage of the third power line PL3 may be different in the first period and the second period.

If the voltage of the third power line PL3 corresponds to the first period, the sensing unit 630 may generate the switching control signal SWCS so that the first switch SW1 is turned off. Then, the first switch SW1 may be set to a turn-off state during the first period.

For example, if the voltage of the third power line PL3 corresponds to the second period, the sensing unit 630 may generate the switching control signal SWCS so that the first switch SW1 is turned on. Then, the first switch SW1 may be set to a turn-on state during the second period. With the first switch SW1 turned on, the first resistor R1 may be connected to the third power line PL3, and thus the voltage (or current) of the third power line PL3 may be similar or equal to that of the first period.

Meanwhile, in an embodiment of the disclosure, the sensing unit 630 may generate the switching control signal SWCS in response to the voltage (or current) of the third power line PL3 so that the voltage of the third power line PL3 becomes constant. Therefore, where the power supply 600 includes the sensing unit 630, the switching control signal SWCS may be generated without a separate programming process.

In addition, as shown in FIGS. 7 and 8, in an embodiment of the disclosure, the virtual load unit 620 may be included in the power supply 600. The power supply 600 may be implemented as a power management integrated circuit (PMIC), and a dead space of the display device 10 is not increased even though the virtual load unit 620 is added.

However, an embodiment of the disclosure is not limited thereto, and the first initialization power supply 610 and the virtual load unit 620 may be included in the data driver 400, the timing controller 500, and/or the like.

Figure 9:
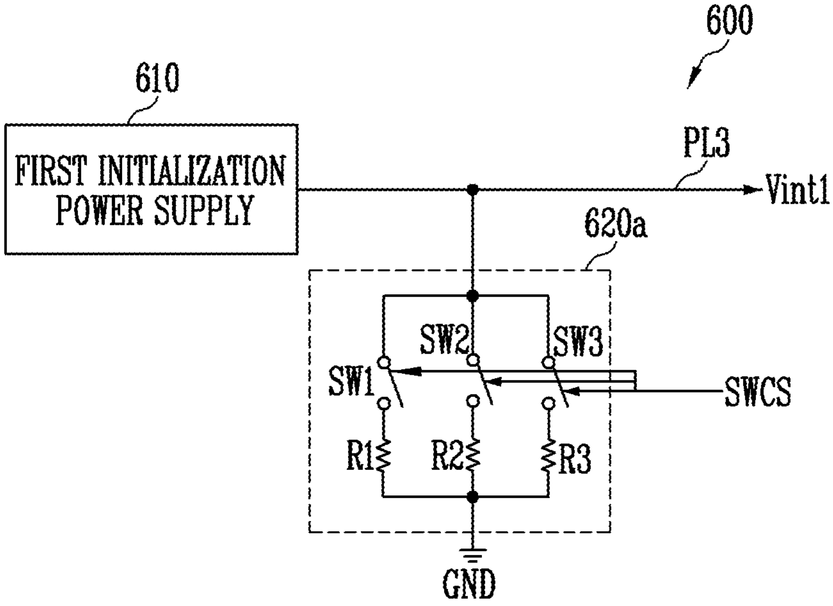
FIG. 9 is a diagram illustrating a power supply according to an embodiment of the disclosure.

FIG. 9 is a diagram illustrating a power supply according to an embodiment of the disclosure. In describing FIG. 9, the same reference numerals are assigned to the same configurations as those of FIG. 7, and any redundant description is omitted.

Referring to FIG. 9, the power supply 600 according to an embodiment of the disclosure may include the first initialization power supply 610 and a virtual load unit 620*a*.

The virtual load unit 620*a* may be connected to the third power line PL3. The virtual load unit 620*a* may provide a virtual load to the third power line PL3 in response to the switching control signal SWCS supplied from the timing controller 500. To this end, the virtual load unit 620*a* may include at least two switches and at least two resistors.

For example, the virtual load unit 620*a* includes a first switch SW1 and a first resistor R1 connected in series between the third power line PL3 and the ground potential GND. In addition, the virtual load unit 620*a* may include at least one additional switch (for example, SW2 and SW3) and an additional resistor (for example, R2 and R3) connected in parallel with the first switch SW1 and the first resistor R1.

For example, the virtual load unit 620*a* may include a plurality of switches SW1, SW2, and SW3 connected in parallel between the third power line PL3 and the ground potential GND, and resistors R1, R2, and R3 connected between the respective switches SW1, SW2, and SW3 and the ground potential GND.

The first switch SW1 and the first resistor R1 may be connected in series between the third power line PL3 and the ground potential GND. The first switch SW1 may be turned on or turned off in response to the switching control signal SWCS. If the first switch SW1 is turned on, the first resistor R1 may be connected to the third power line PL3.

The second switch SW2 and the second resistor R2 may be connected in series between the third power line PL3 and the ground potential GND. The second switch SW2 may be turned on or turned off in response to the switching control signal SWCS. If the second switch SW2 is turned on, the second resistor R2 may be connected to the third power line PL3.

The third switch SW3 and the third resistor R3 may be connected in series between the third power line PL3 and the ground potential GND. The third switch SW3 may be turned on or turned off in response to the switching control signal SWCS. With the third switch SW3 turned on, the third resistor R3 may be connected to the third power line PL3.

The switching control signal SWCS may be supplied from the timing controller 500, and may control each of turn-on and turn-off of the first switch SW1, the second switch SW2, and the third switch SW3 so that the load of the third power line PL3 becomes constant.

At least three non-emission periods may be included during one frame period, and thus the plurality of switches SW1, SW2, and SW3 and the plurality of resistors R1, R2, and R3 may also be included in the virtual load unit 620*a*. The plurality of switches SW1, SW2, and SW3 may be turned on and turned off at the same timing and/or different timings in response to the switching control signal SWCS.

Figure 10:
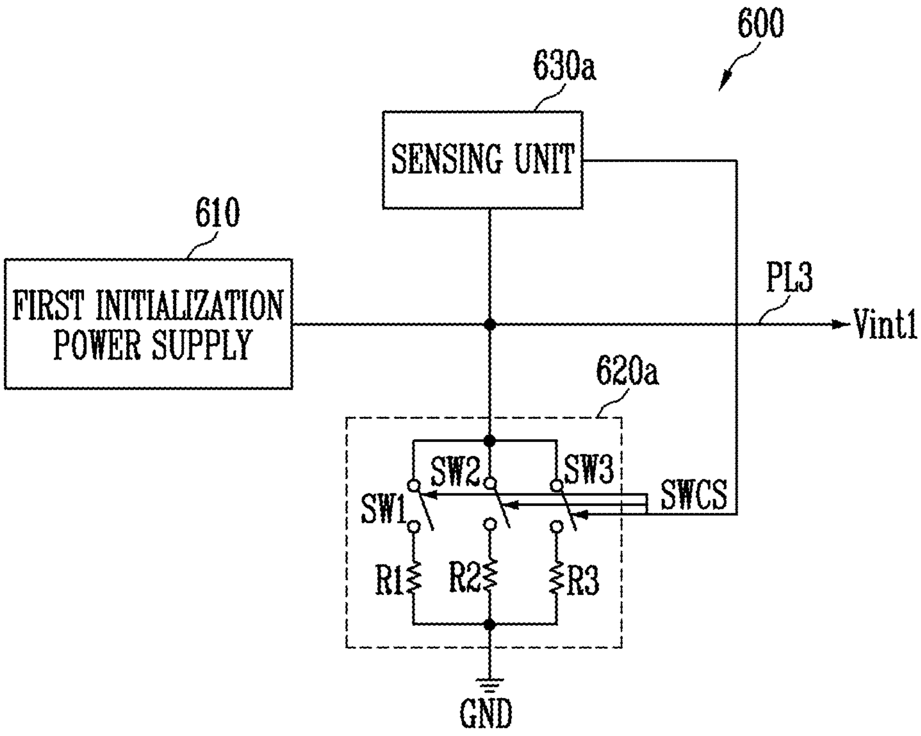
FIG. 10 is a diagram illustrating a power supply according to an embodiment of the disclosure.

FIG. 10 is a diagram illustrating a power supply according to an embodiment of the disclosure. In describing FIG. 10, the same reference numerals are assigned to the same configurations as those of FIGS. 8 and 9, and any redundant description is omitted.

Referring to FIG. 10, the power supply 600 according to an embodiment of the disclosure may include the first initialization power supply 610, the virtual load unit 620*a*, and a sensing unit 630*a*.

The sensing unit 630*a* may be connected to the third power line PL3 and may sense the voltage of the third power line PL3. The sensing unit 630*a* may generate the switching control signal SWCS so that the first switch SW1, the second switch SW2, and/or the third switch SW3 is turned on or turned off in response to the voltage of the third power line PL3. The sensing unit 630*a* may control turn-on or turn-off of the first switch SW1, the second switch SW2, and/or the third switch SW3 so that the voltage of the third power line PL3 becomes constant.

Figure 11:
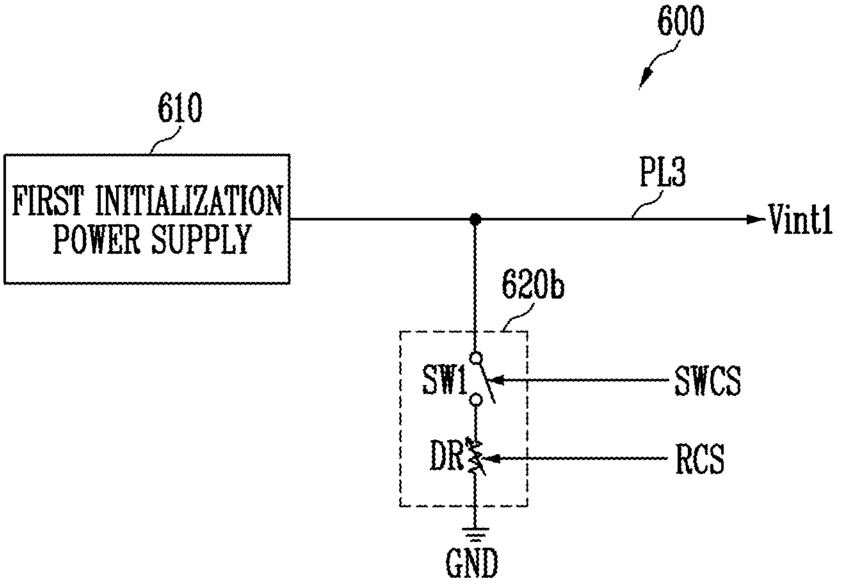
FIG. 11 is a diagram illustrating a power supply according to an embodiment of the disclosure.

FIG. 11 is a diagram illustrating a power supply according to an embodiment of the disclosure. In describing FIG. 11, the same reference numerals are assigned to the same configurations as those of FIG. 7, and any redundant description is omitted.

Referring to FIG. 11, the power supply 600 according to an embodiment of the disclosure may include the first initialization power supply 610 and a virtual load unit 620*b*.

The virtual load unit 620*b* may be connected to the third power line PL3. The virtual load unit 620*b* may provide the virtual load to the third power line PL3 in response to the switching control signal SWCS supplied from the timing controller 500. The virtual load unit 620*b* may include a first switch SW1 and a digital resistor DR connected in series between the third power line PL3 and the ground potential GND.

The first switch SW1 may be turned on and turned off in response to the switching control signal SWCS supplied from the timing controller 500. A resistance value of the digital resistor DR may be controlled in response to a resistance control signal RCS supplied from the timing controller 500.

The timing controller 500 may generate the switching control signal SWCS and the resistance control signal RCS so that the load of the third power line PL3 becomes constant. For example, the timing controller 500 may set the first switch SW1 to a turn-on state during the second period of one frame and may control the resistance value of the digital resistor DR to have the same load as that of the first period.

Figure 12:
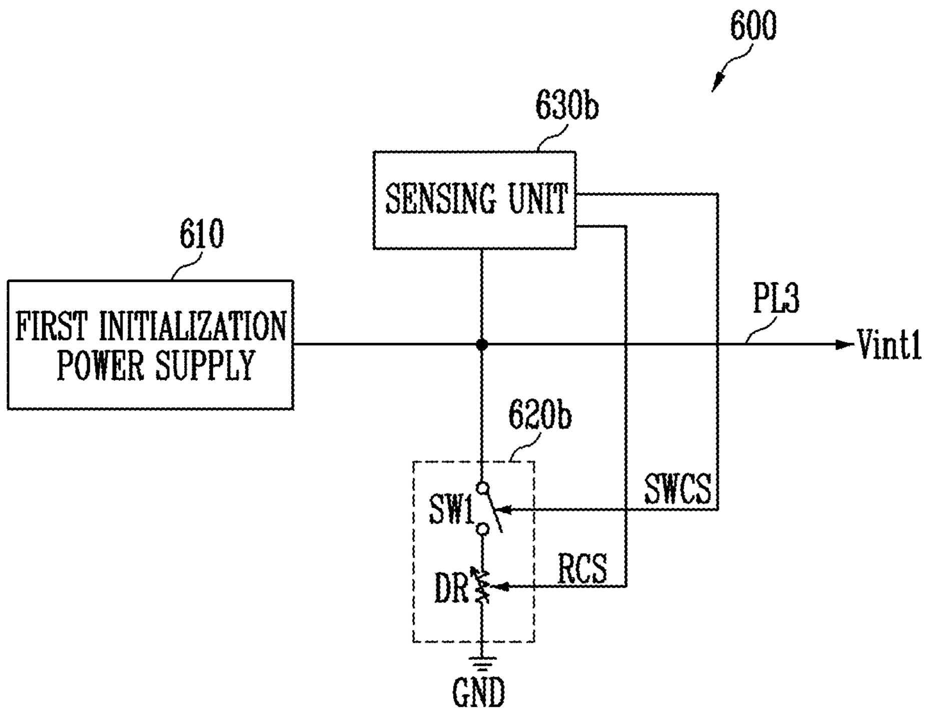
FIG. 12 is a diagram illustrating a power supply according to an embodiment of the disclosure.

FIG. 12 is a diagram illustrating a power supply according to an embodiment of the disclosure. In describing FIG. 12, the same reference numerals are assigned to the same configurations as those of FIGS. 8 and 11, and any redundant description is omitted.

Referring to FIG. 12, the power supply 600 according to an embodiment of the disclosure may include the first initialization power supply 610, the virtual load unit 620*b*, and a sensing unit 630*b*.

The sensing unit 630*b* may be connected to the third power line PL3 and may sense the voltage of the third power line PL3. The sensing unit 630*b* may control turn-on of the first switch SW1 and the resistance value of the digital resistor DR in response to the voltage of the third power line PL3. To this end, the sensing unit 630*b* may supply the switching control signal SWCS to the first switch SW1 in response to the voltage of the third power line PL3, and supply the resistance control signal RCS to the digital resistor DR.

The sensing unit 630*b* may generate the switching control signal SWCS and the resistance control signal RCS so that the voltage of the third power line PL3 becomes constant. For example, the sensing unit 630*b* may control turn-on and turn-off of the first switch SW1 and the resistance value of the digital resistor DR so that the voltage of the third power line PL3 maintains a constant voltage.

Figure 13:
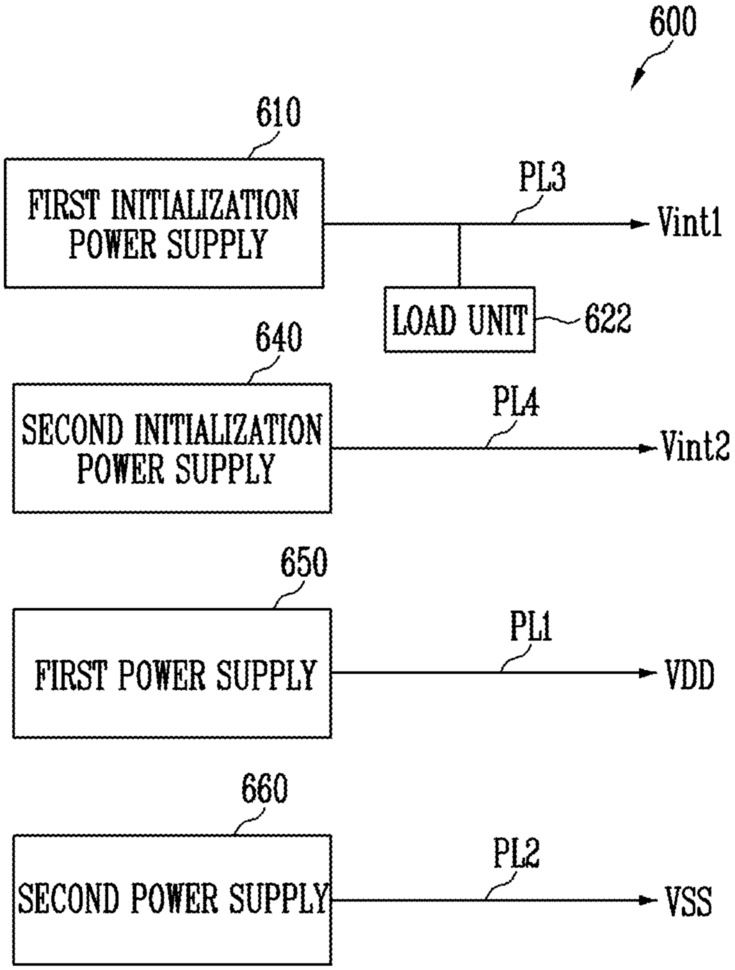
FIG. 13 is a diagram illustrating a power supply according to an embodiment of the disclosure.

FIG. 13 is a diagram illustrating a power supply according to an embodiment of the disclosure.

Referring to FIG. 13, the power supply 600 according to an embodiment of the disclosure may include the first initialization power supply 610, a second initialization power supply 640, a first power supply 650, a second power supply 660, and a load unit 622.

The first initialization power supply 610 may supply the voltage of the first initialization power Vint1 to the third power line PL3.

The load unit 622 may be connected to the third power line PL3 and may provide an additional load to the third power line PL3. The load unit 622 may include at least one of the virtual load units 620, 620*a*, and 620*b* and the sensing units 630, 630*a*, and 630*b* shown in FIGS. 7 to 12.

The second initialization power supply 640 may supply the voltage of the second initialization power Vint2 to the fourth power line PL4.

The first power supply 650 may supply the first driving power VDD to the first power line PL1.

The second power supply 660 may supply the second driving power VSS to the second power line PL2.

Although the above has been described with reference to the embodiments of the disclosure, those skilled in the art will understand that the disclosure may be variously corrected and modified within the scope without departing from the spirit and scope of the claims.

What is claimed is:

1. A display device comprising:

a pixel including a light emitting element, a pixel circuit for controlling a current flowing from a first power line to a second power line via the light emitting element, and an initialization transistor connected between an anode electrode of the light emitting element and a third power line to which a voltage of initialization power is supplied; and a power supply for supplying the initialization power, wherein the power supply comprises:

an initialization power supply for supplying the initialization power;

a virtual load unit connected to the third power line and providing an additional load to the third power line, the virtual load unit including a first switch and a first resistor connected in series between the third power line and a ground potential; and a sensing unit for sensing at least one of a voltage and a current of the third power line and controlling the virtual load unit in response to at least one of the sensed voltage and current.

2. The display device according to claim 1, further comprising:

a timing controller for controlling the virtual load unit.

3. The display device according to claim 2, wherein the timing controller maintains a constant load on the third power line by controlling the first switch.

4. The display device according to claim 2, wherein the virtual load unit includes at least one additional switch and an additional resistor connected in parallel with the first switch and the first resistor, and each of the first switch and the additional switch is turned on or turned off under control of the timing controller.

5. The display device according to claim 1, wherein the sensing unit maintains a constant voltage on the third power line by controlling the first switch.

6. The display device according to claim 1, wherein the virtual load unit includes at least one additional switch and an additional resistor connected in parallel with the first switch and the first resistor, and the sensing unit maintains a constant voltage on the third power line by controlling the turn-on and turn-off of the first switch and the additional switch.

7. The display device according to claim 1, wherein the first resistor is a digital resistor.

8. The display device according to claim 7, wherein the sensing unit controls the first switch and a resistance value of the first resistor, and maintains a constant voltage on the third power line.

9. The display device according to claim 1, wherein the initialization transistor is turned on in response to a first scan signal being supplied to a first scan line, and the first scan signal is supplied at least twice during one frame period.

10. The display device according to claim 1, wherein the power supply further comprises:

a first power supply for supplying first driving power to the first power line; and a second power supply for supplying second driving power having a voltage lower than that of the first driving power to the second power line.

11. The display device according to claim 1, wherein a resistance value of the first resistor is predetermined.

12. The display device according to claim 11, the pixel further comprising:

a plurality of scan lines connected to and supplying a first scan signal to the pixel circuit, wherein the resistance value of the first resistor corresponds to the load applied to the third power line by one scan line of the plurality of scan lines that is supplying the first scan signal.

13. A display device comprising:

a pixel including a light emitting element, a pixel circuit for controlling a current flowing from a first power line to a second power line via the light emitting element, and an initialization transistor connected between an anode electrode of the light emitting element and a third power line to which a voltage of initialization power is supplied;

a power supply for supplying the initialization power, wherein the power supply comprises:

an initialization power supply for supplying the initialization power; and a virtual load unit connected to the third power line and providing an additional load to the third power line, the virtual load unit including a first switch and a first resistor connected in series between the third power line and a ground potential, the first resistor being a digital resistor; and a timing controller for controlling the virtual load unit and controlling the turn-on and turn-off of the first switch and a resistance value of the first resistor so that a load on the third power line is constant.

14. The display device according to claim 13, wherein the virtual load unit includes at least one additional switch and an additional resistor connected in parallel with the first switch and the first resistor, and each of the first switch and the additional switch is turned on or turned off under control of the timing controller.

15. The display device according to claim 13, wherein the power supply further comprises:

a first power supply for supplying first driving power to the first power line; and a second power supply for supplying second driving power having a voltage lower than that of the first driving power to the second power line.

16. The display device according to claim 13, wherein the initialization transistor is turned on in response to a first scan signal being supplied to a first scan line, and the first scan signal is supplied at least twice during one frame period.

* * * * *